US006833172B1

(12) United States Patent
Schwartz

(10) Patent No.: US 6,833,172 B1
(45) Date of Patent: Dec. 21, 2004

(54) TWO SIDED STICKYS

(75) Inventor: David C. Schwartz, Southboro, MA (US)

(73) Assignee: Productive Environments, Inc., Framingham, MA (US)

( * ) Notice: Subject to any disclaimer, the term of this patent is extended or adjusted under 35 U.S.C. 154(b) by 199 days.

(21) Appl. No.: 09/735,375

(22) Filed: Dec. 12, 2000

Related U.S. Application Data

(60) Provisional application No. 60/170,333, filed on Dec. 13, 1999.

(51) Int. Cl.$^{7}$ .................................................. B32B 3/04

(52) U.S. Cl. ..................... 428/40.1; 206/411; 428/42.1; 428/42.2; 428/42.3; 428/43; 428/121; 428/124; 428/343; 428/906

(58) Field of Search ............................... 428/40.1, 42.1, 428/42.2, 42.3, 43, 121, 124, 343, 906; 206/411

(56) References Cited

U.S. PATENT DOCUMENTS

| | | | | | |
|---|---|---|---|---|---|
| 2,346,219 | A | * | 4/1944 | Johnson | 206/411 |
| 2,732,065 | A | * | 1/1956 | Marchese | 428/906 |
| 3,257,678 | A | * | 6/1966 | Batchelder | 206/411 |
| 4,978,143 | A | * | 12/1990 | Ericson | 283/38 |

* cited by examiner

*Primary Examiner*—Nasser Ahmad

(57) ABSTRACT

What is provided is a leaf having adhesive on one side which is formed as a plurality of panels and has a series of fold hints between panels thereof, where the folds hints make folding of each panel onto the other easy, and where the fold hints are provided either by the unique shape of the panels one to the next, or by lines of perfection. The invention provides such a sticky leaf that can be lifted up and formed into a loop by folding on the perf hints and to the delivery of such a sticky leaf as a sheet of multiple leaf members, a roll, or a individual leafs.

3 Claims, 3 Drawing Sheets

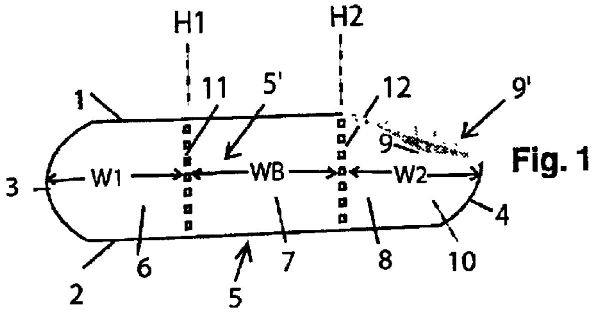
Fig. 1
Fig. 1a
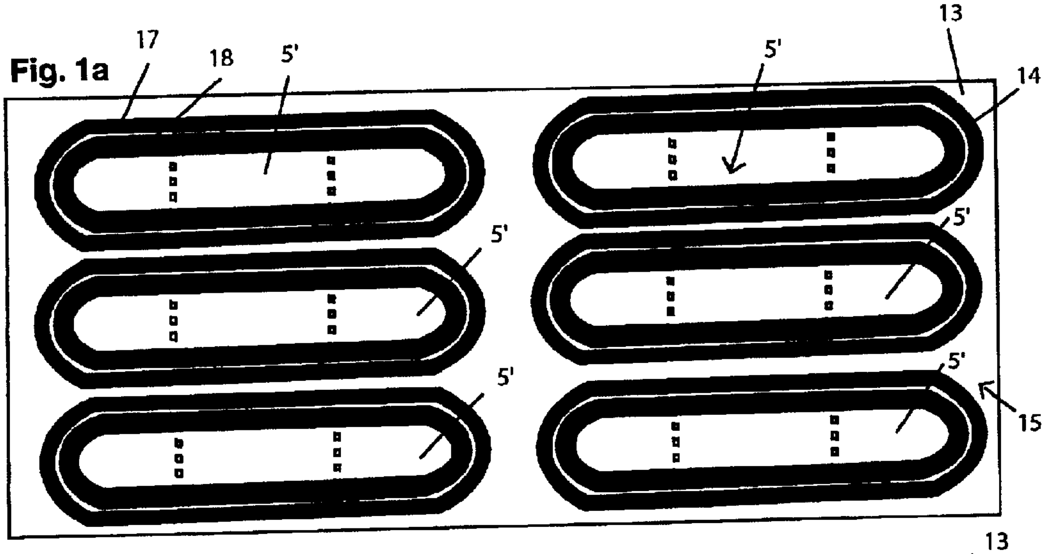
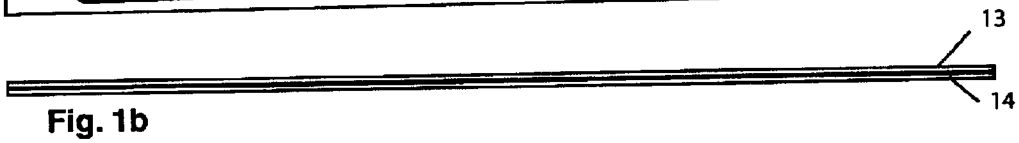
Fig. 1b
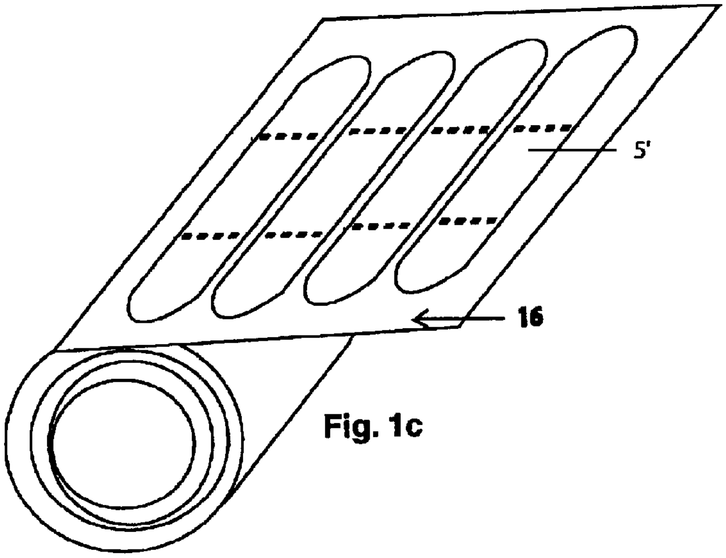
Fig. 1c

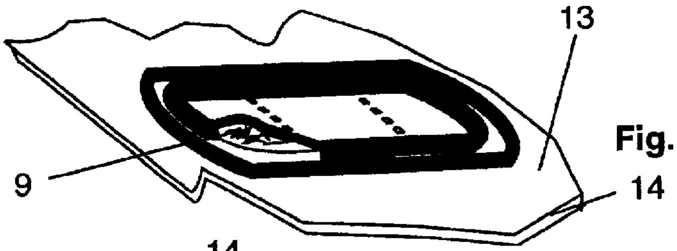
Fig. 1d
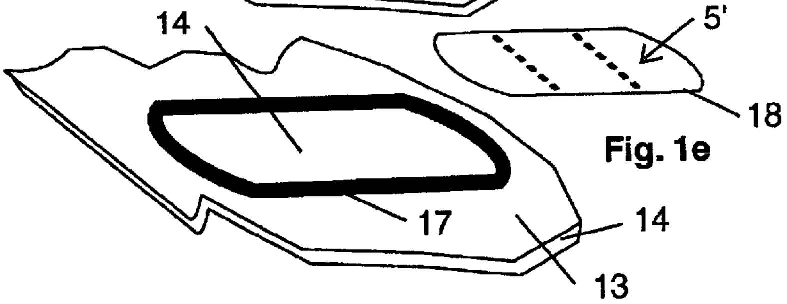
Fig. 1e
Fig. 1f
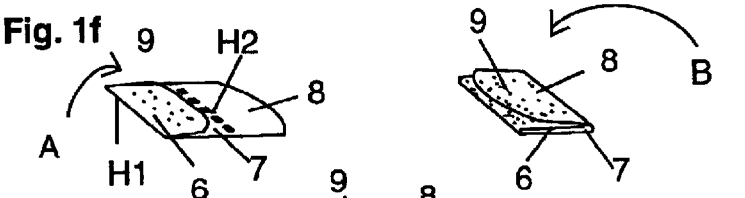
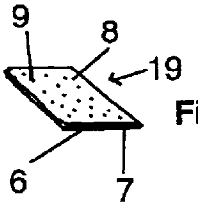
Fig. 1g
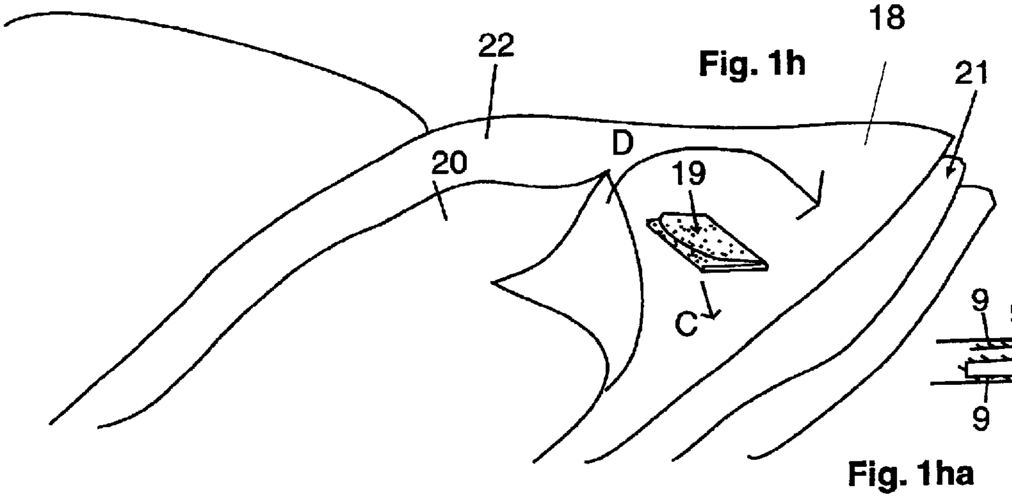
Fig. 1h
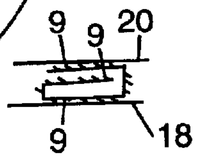
Fig. 1ha

TWO SIDED STICKYS

This patent application is a formal filing on provisional patent application 60/170,333 filed Dec. 13, 1999.

BACKGROUND OF THE INVENTION

This invention relates to ways of attaching one leaf to another and in particular to ways of making the attachment that hide the attachment means. The invention relates to various two sided sticky means used for attaching one object to another, in particular one leaf like member to a second leaf like member, preferably paper leafs.

The invention relates to means such as two way sticky tapes, roll on two way adhesive, glues and the like means for attaching one leaf to another.

Tape with adhesive on one side has been the preferred means for attaching one leaf to another. When forming an attachment with such single sided adhesive tape, the tape is normally applied to the top face of the two surfaces to be joined. In this case, the tape shows across the top face of both objects. If it is desired to "hide" the tape, the tape can be formed into a loop so that the outer surface of the loop so formed is continuously adhesive. When the band of adhesive is pressed onto a host surface and sandwiched between the leaf to be attached to the host, a permanent bond is formed hiding the loop of adhesive inside and between the two attached surfaces. Glues and two way tapes, whether double sided adhesive tape or roll applied sticky strips solve this problem of hiding the adhesive.

This invention relates in particular to portable means for providing a two way taping mechanism that allow for the hiding of the taping means. The invention further relates to portable means where the portability means provide a substantially flat delivery format and where the flat format can be carried in books such as journals, organizers, notebooks and the like without adding substantially weight or bulk to the means on which they are carried therein. This invention further relates to the preferred means for delivering such a "hiding tape system" using only a single sided adhesive substrate.

Making a tape loop has been available and has served as a way to provide a hiding tape system for attaching two leaves together. The problem with this is multifold. First, in order to easily construct a loop, manipulating the loop with fingers to form the continuous band of adhesive, a reasonable amount of tape needs to be taken. This often results in a loop of size which has a spring like effect at the center, causing the leafs to appear to separate if pulled as the tape loop lifts with the slack and flexibility of the leaf portion adhered to. This is an undesirable result. Also, it is often the case that the tape skews off parallel when looped, causing a kink in the tape when the tape is pressed flat. This leads to a remarkable and noticeable bulking at the tape join between the leaves. This is also an undesirable result. With regard to portability, tape is most often delivered in a roll format, so looping means are not readily delivered in flat books, unless the tape roll is somehow attached to the books outside so that it is available when needed, on demand. This is clearly impractical, so this means is not portable in accordance with the definition of the intended application of the invention herein. Tape strips have been delivered flat, however, since they have a sticky side, the means for delivery has been the stacking of tape strips, one on top of the next to form a stacked bundle of strips. Each strip edge is often provided with a release coated sheet edge so that each strip in succession can be peeled off, then the release edge is removed, and a tape strip is available for application. This would work ok, but the number of strips would be limited by their thickness and accumulation of height when stacked, as we have indicated that this invention relates to substantially flat means for delivering tape looping systems for books and the like.

The invention relates to a way to deliver a flat binding system capable of delivering a looped binding means where the formation of the loop is such that it can be made substantially small, reducing the spring effect, and substantially unskewed resulting in a substantially perfect flat loop on adhesion. The invention relates to a very low cost way of delivering such a looped binding means where the object for forming the loop can be made from a paper tape, effectively the form of a paper label, and where the looping mechanism is guided by a plurality of fold hints, preferably in the form of a series of perforation lines. The invention therefore relates to the provision of a sticky leaf capable of being easily formed into a loop, hence a sticky loop. The invention relates to the construction of such a sticky loop as a sheet of sticky loops, a roll of sticky loops, a hybrid sheet of sticky loops and other label like objects on the same substrate. The invention relates to the delivery of a paper sticky loop having an adhesive on one side, where the sticky loop leaf member is attached to a release coated leaf member, thereby making it particularly easy to peel the sticky loop off for subsequent assembly and attachment. The invention relates to the printing of the face of the sticky loop for the purpose of not only highlighting the edges thereof but also for providing instructions on use, or for merely making the object fun or interesting to look at.

The invention relates to other formations of shapes for providing an end object which effectively has sticky adhesive on opposing sides and lies substantially flat. This includes multipanel shapes in various images, multipanel shapes that are both linear as well as multipanel shapes that ar nonlinear.

Therefore, the invention relates to a leaf having adhesive on one side which is formed as a plurality of panels and is provided with a series of fold hints between panels thereof, where the fold hints make folding of each panel onto the other easy, and where the fold hints are provided either by the unique shape of the panels one to the next, or by lines of perforation. The invention relates to the delivery of such a sticky leaf formable into a sticky loop as a sheet of multiple leaf members, a roll, or a individual leafs.

SUMMARY OF THE INVENTION

The invention relates to the provision of a multipanel leaf which has adhesive on one side, and which can be easily and correctly folded into a loop having continuous adhesive, and which in turn can be laid substantially flat in a single plane providing effectively two adhesive sides, a top adhesive side and a bottom adhesive side.

It is the object of this invention to provide a "sticky loop" paper label where a sticky loop paper label is a paper label having an adhesive on only one side as a strip having three panels separated by a series of fold hints for interfolding one panel onto the other, where the panels are sized so as to fold one on top of the other to form a continuous loop with adhesive on the entire outer continuous surface.

It is an object of this invention to provide a plurality of sticky loop paper labels on label bearing sheet adhered to a release coated planar base sheet by a permanent or semi-permanent adhesive on one side, the down side, of the label bearing sheet, where the sticky labels are die cut out as a pattern on the top label bearing sheet, and where the non label portion of the top label bearing sheet is either stripped out or not stripped out.

It is an object of this invention to provide a plurality of sticky loop paper labels on a label bearing sheet of paper having adhesive on its down side attaching it to a release coated rolled strip base sheet, where the sticky labels are die cut out as a pattern on the top label bearing sheet and the non label portion of the top label bearing sheet is either stripped out or not stripped out.

It is an object of this invention to provide such a sticky loop label where the loop is formed as a linear set of at least three panels of widths permitting the panels to be interfolded one on top of the other. It is a further object of this invention to provide such a sticky loop where the base panel width is greater than either of the two side panel widths, and where the sum of the side panel widths is larger than the base panel width, so that when both side panels are folded over, they "reach" one another and can be bonded by the adhesive on one of the panels.

It is an object of this invention to provide a sticky loop label of at least three panels where two adjoining panels are substantially the same width, and the third panel is less than the width of either of the two adjacent panels of the same width.

It is an object of this invention to provide a sticky loop label of at least three panels where the width of the first panel is less than the width of the second panel which is less than the width of the third panel.

It is an object of this invention to provide a sticky loop label of at least three panels separated by perf fold hints, where the width of each of the panels is substantially equal but where the base panel is at least wider than the other two panels by the width of the perf fold hint.

It is an object of this invention to provide a three panel sticky loop that is formed by sides that are substantially orthogonal one to the other.

It is an object of this invention to provide a three panel sticky loop that is formed by a multiple of panels where the shape of each of the panels is formed by sides that are other than orthogonal with respect to eachother. In particular, it is an object of this invention to provide a sticky loop of at least three panels where the panels are substantially round and are joined by indentations which themselves provide the fold guides. It is the object of this invention to provide such a three round panel label with each section further separated by a fold hint of a perforated line.

It is a further object of this invention to provide such a label system with printed markings on at least the label.

It is an object of this invention to provide a three panel label of the type detailed above where each label panel is offset with respect to the next panel.

It is an object of this invention to provide a 5 panel label of the type described capable of joining two panels resulting in a four panel loop capable of "rolling" into a position where two panels are down and two are up.

It is an object of this invention to provide a sticky label of multiple panels where the number of panels exceeds three and where the panels still interfold one onto the other and onto a base to form a continuously sticky object having two sides.

In accordance with this invention, what is provide is(see detailed description of the invention).

BRIEF DESCRIPTION OF THE DRAWINGS

The above and other objects and advantages of the invention will be apparent from consideration of the following detailed description, taken to conjunction with the accompanying drawings, in which like reference characters refer to like parts throughout, and in which:

FIG. 1 Shows a planar view of s three panel sticky loop label

FIG. 1*a* Shows an array of three panel sticky loop labels of FIG. 1 on a diecut sheet FIG. 1*b* shows a planar view of a label sheet having a plurality of three panel sticky loop labels FIG. 1*c* Shows a perspective drawing of a roll of sticky loop labels.

FIG. 1D Shows a perspective drawing of a sticky loop label with the edge peeled up FIG. 1E shows the drawing of 1*d* with the label removed FIG. 1F shows the removed label of 1*e* with the first panel and second panels folded over FIG. 1G shows the label of 1*f* pressed flat having a continuous surface of adhesive FIG. 1*h* Shows the label of FIG. 1*g* inserted into a book on a page where a leaf is about to be pressed onto it FIG. 1Ha shows the side view of the leafs with the label sandwiched between.

FIG. 1*l* shows the label of FIG. 1 with printed indicia for highlighting the by perforation

DETAILED DESCRIPTION OF THE INVENTION

Figure 1I:
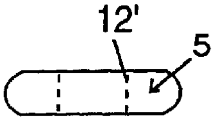
Figure 7:
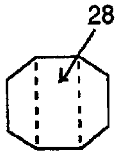
FIG. 7 Shows a three panel label with quadrilateral sides
Figure 17:
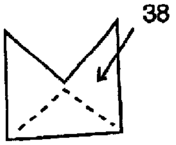
FIG. 17 shows three triangular sections offset one from the other
Figure 2:
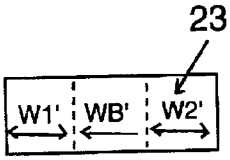
FIG. 2 shows a label where the widths of each panel are substantially equal FIG. 3 show s a label where the widths of the two outer panels are less than the width of the base but of sufficient width to overlap one another
Figure 8:
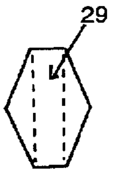
FIG. 8 shows a three panel label with triangular panel sides
Figure 12:
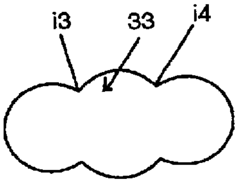
FIG. 12 shows a three panel label made from three panels that are substantially circular
Figure 18:
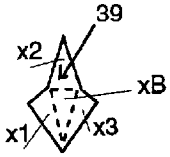
FIG. 18 shows a four panel section of triangular panels
Figure 3:
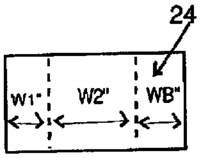
Figure 9:
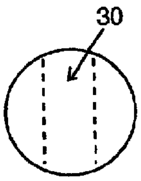
FIG. 9 shows a three panel label that is circular
Figure 13:
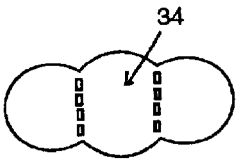
FIG. 13 shows a three panel label where the circular sections are separated by a perfed fold hint
Figure 19:
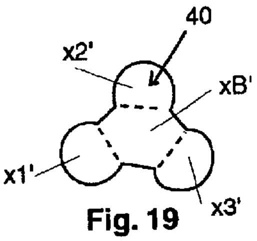
FIG. 19 shows a four panel section having three circular panels
Figure 4:
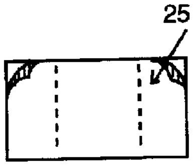
FIG. 4 shows the peeling up of the edges of the label of FIG. 3 delivered as a single label
Figure 10:
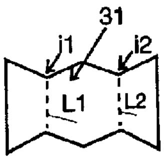
FIG. 10 shows a three panel label made out of three quadrilateral panel sections
Figure 14:
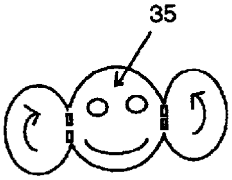
FIG. 14 shows a three panel label where the side panels are formed to be smaller than the base panel and to look like ears
Figure 20:
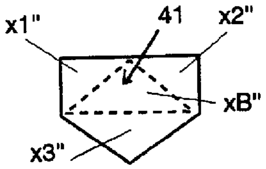
FIG. 20 shows an irregular shape of multiple triangular panels numbering 4
Figure 5:
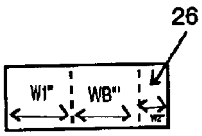
FIG. 5 shows a three panel label where the base and one side are of substantially the same width and the third panel is smaller
Figure 15:
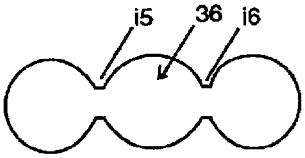
FIG. 15 shows a three panel label where circular side panels are separated by a small landed area
Figure 21:
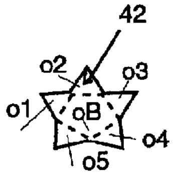
FIG. 21 shows a 5 sided star shape with a common base panel
Figure 6:
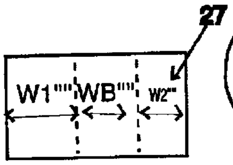
FIG. 6 shows a three panel label where each successive panel width is large than the preceding one.
Figure 11:
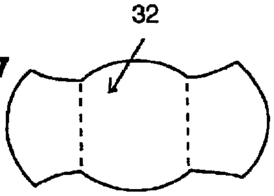
FIG. 11 shows a three panel label made out of three panels that have curvilinear sections
Figure 16:
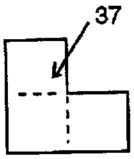
FIG. 16 shows three rectangular sections offset one from the other
Figure 22:
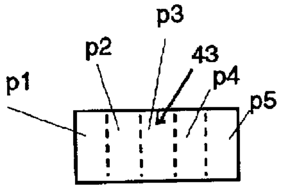
FIG. 22 shows a linear set of 5 panels where each panel is separated by a perf fold hint

A preferred embodiment of the invention is shown in FIG. 1, and deployed in FIG. 1*b*. The preferred embodiment is shown in application in FIGS. 1*d*-1*ha*. What is shown is a paper label, 5, formed into three panels 6,7, and 8. The label has opposing sides 1 and 2 and opposing ends 3 and 4. There are two perf fold hints where the perfs are purposefully made not to tear by including enough landed space between each cut, and the perfs separate the label into three panels. The width of the base panel wb is greater than the widths w1 and w2, but the sum of the widths w1 and w2 is greater than the width wb, so the side panels overlap when folded one on top of the other on top of the base. The adhesive 9 may be either permanent or removable adhesive. In FIG. 1*a*, a release coated base substrate 14 is the host for a label bearing sheet 13 which has the labels cut out , 5, and which is also printed with a wide sine formed by the combination of lines 17, and 18 so as to highlight were the labels are on the sheet and so as to demark the edges of the label when removed. The release coating 14 is seen through the hair line crack formed between the lines 17 and 18 when the label is kiss die cut. FIG. 1C shows deployment in a roll where the non label bearing portion of the label bearing sheet has been stripped out, leaving only the sticky loop labels. FIG. 1D shows the peeling step for removing. the label. In FIG. 1E, the label 5 is shown removed from the label holding sheet. In FIG. 1*f* the label sides are interfolded about H1 and H2, with the first fold "a" putting the left most panel onto the base, and the next fold "b" putting the right most panel onto the left most panel, adhesive bonding the surfaces together to form the loop of continuous adhesive, shown in FIG. 1*g*. "Pressed" together into a flat planar structure. In FIG. 1*h* the looped label 19 is placed on the page of a host book page 18, and a leaf 20 is placed onto it, so FIG. 1Ha shows the side view of the label enclosed between.

The preferred adhesive is a permanent adhesive. The sheet should be white so as not to show through any translucent leaves which are bonded together by the sticky loop. The primary objective is to keep the loop small and tight to eliminate the spring effect that occurs when such a loop is formed. By providing the perfed fold hints, a relatively small strip can be easily handled and formed into a loop and the parallel perf folds ensure that the strip is formed into a parallel loop which is not skewed or warped, therefore it is designed by invention to lie perfectly flat, providing two good surfaces with adhesive for proper bonding of a top leaf to a host leaf when the sticky loop is sandwiched between a firmly pressed. The adhesive used is any pressure sensitive adhesive. A removable adhesive with reasonable tack would be perfectly suitable and might be useful in one or more applications where the attachment of the leaf is intended to be temporary.

Figure/Element Numbers/Descriptions

| FIG. | ELEMENT # | DESCRIPTION |
|---|---|---|
| 1 | 1 | opposing upper edge of sticky loop |
| | 2 | opposing lower edge of sticky loop |

-continued

| FIG. | ELEMENT # | DESCRIPTION |
|---|---|---|
| | 3 | opposing left side edge of sticky loop |
| | 4 | opposing right side edge of sticky loop |
| | 5 | sticky loop |
| | 5' | front face of sticky loop |
| | 6 | first fold over panel |
| | 7 | base panel |
| | 8 | second fold over panel |
| | 9 | adhesive on back face of sticky loop |
| | 9' | back face of sticky loop |
| | 10 | back face of second fold over panel |
| | 11 | first fold hint folding perforation |
| | 12 | second fold hint folding perforation |
| | 13 | label bearing adhesive sheet |
| | 14 | release coating host sheet |
| | 15 | master sheet of sticky loops |
| | 16 | master roll of stripped sticky loops |
| | 17 | outer print overlap marking |
| | 18 | inner print overlap marking |
| | 19 | flat folded sticky loop |
| | 20 | leaf to be attached |
| | 21 | host book with receiving leaves |
| | 22 | host book page for receiving a loop |
| | A | first fold over H1 |
| | B | second fold over H2 |
| | C | attach motion stick loop to page |
| | D | attach motion of leaf to sticky loop |
| | 12' | printed indicia demarking a fold hint |
| | 23 | retangular paneled sticky loop |
| | W1' | width panel 1 <approx=> width panel B'(WB') <approx=> width W2' |
| | WB' | width base panel |
| | W2' | width of second panel |
| | W1" | W1" <approx=> W2" |
| | WB" | W1" < WB" |
| | W2" | W1" + W2" > WB" |
| | 25 | preferred print indicia teaching how to peel up edges |
| | 26 | W1"' <approx=> WB"'; W2"' < WB"' |
| | 27 | W1"" > WB"" > W2"" |
| | 28 | rectilinear irregular |
| | 29 | rectilinear irregular |
| | 30 | circular |
| | 31 | I1 and I2 form fold hints, L1 & L2 just printed |
| | 32 | odd curvilinear loop |
| | 33 | I3 & I4 form fold hints, circular panel construction |
| | 34 | fold perf assisted curvilinear panel construction |
| | 35 | figure face indicia on a curvilinear construction |
| | 36 | fold hints I5 & I6 as "long" land between curved panels |
| | 37 | adjacent but orthogonal panels rectangular |
| | 38 | adjacent but skewed off triangular fold panels |
| | 39 | quad triangle x1x2x3xB panels |
| | 40 | quad curvilinear & irregular base x1',x2',x3'xB' |
| | 41 | quad triangular x1", x2", x3", xB" |

What is claimed is:

1. A sticky loop for attaching any two leaves together, formed from an adhesive strip of foldable material, said sticky loop having perimeter features comprising solely three panels of predetermined widths, said sticky loop having a front face side and a back face side, said three panels comprising a first fold over panel, a base panel, and a second fold over panel, said three panels each having a common edge one with respect to the next, wherein said first fold over panel has a predefined width W1 and common edge with said base panel, said base panel has a predefined width WB and a common edge with said second fold over panel, and said second fold over panel has a predefined width W2, said sticky loop having a pressure sensitive adhesive on solely one of either said face side or said back side, where said each of said common edges is a fold hint structure comprising a hinge formed as a perforated line having a series of perforations and land areas permitting said each common edge to act as a hinge and to fold without tearing and where said predefined width of said base panel, WB, is substantially equal to or wider than said each of said predefined widths of said first fold over panel W1, and said second fold over panel, W2, and where the sum of the predefined widths of said first fold over panel and said second fold over panel W1 plus W2 is greater than the predefined width of said base panel, WB, for permitting said first fold over panel and said second fold over panel to overlap when folded over said fold hint onto said base panel, so that when said first fold over panel and said second fold over panel are folded one onto the other over said base panel in such manner as to place said one side of adhesive on the outer side of said folds, said first fold over panel and said second fold over panel adhere one to the other and thereby form a continuous flat sticky loop of material having said adhesive on said one side appear on the entire outer surface of said looped structure so formed, for forming a two sided sticky object for placing between any two leaves for attaching any such two leaves one to the other.

2. A sticky loop for attaching any two leaves together formed from an adhesive strip of foldable material, said sticky loop having perimeter features comprising solely three panels, said sticky loop having a front face side and a back face side, said three panels including a first panel, a second panel, and a third panel, said three panels each having a common edge one with respect to the next, wherein said first panel has a predefined width W1 and common edge with said second panel, said second panel has a predefined width W2 and a common edge with said third panel, and said third panel has a predefined width W3, said sticky loop having a pressure sensitive adhesive on solely one of either said face or said back side, where said common edge of said first, second, and third panels is a fold hint structure comprising a hinge formed as a perforated line having a series of perforations and land areas permitting the hinge to fold without tearing, and where said predefined width of said first panel, W1, is substantially said predefined width of said second panel, W2, and said predefined width of said third panel, W3, is less than either of said predefined widths of said first panel, W1, and said second panel, W2, for permitting said first panel to fold over said second panel and said third panel to attach to said first panel when said third panel is folded over said fold hint to adhere with said first panel, such that when said first panel is folded back over with said adhesive on said one side oriented to be on the outer side of said fold, and said third panel is folded over so as to adhere to said first panel, said first, said second and said third panels form a continuous flat loop, with said adhesive on said one side showing on the entire outer surface of the looped structure so formed, for providing a two sided sticky object for attaching any two such leaves, one to the other.

3. A sticky loop for attaching two leaves together formed from an adhesive strip of foldable material, said sticky loop having perimeter features comprising solely three panels, said sticky loop having a front face side and a back face side, said three panels including a first panel, a second panel, and a third panel, said three panels each having a common edge one with respect to the next, wherein said first panel has a predefined width W1 and common edge with said second panel, said second panel has a predefined width W2 and a common edge with said third panel, and said third panel has a predefined width W3, said sticky loop having a pressure sensitive adhesive on solely one of either said face side or said back side, where said common edge of said first, second, and third panels is a fold hint structure comprising a hinge formed as a perforated line having a series of perforations and land areas permitting the hinge to fold without tearing, and where said predefined width of said first panel, W1, is less than said predefined width of said second panel, W2, and said predefined width of said second panel, W2, is less than said predefined width of said third panel, W3, for permitting said first panel to fold over said second panel and said second panel to fold over said third panel and to attach to said first panel when said paneled structure is folded over said fold hints, one panel over the next, such that when said first panel is folded back over with said adhesive on said one side oriented to be on the outer side of said fold, and said second panel is folded over so as to permit said first panel to adhere to said third panel, said first, said second and said third panels form a continuous flat loop, with said adhesive on said one side showing on the entire outer surface of the looped structure so formed, for providing a two sided sticky object for attaching any such two leaves, one to the other.

* * * * *